(12) United States Patent
Tsai et al.

(10) Patent No.: US 8,981,600 B2
(45) Date of Patent: Mar. 17, 2015

(54) LOW-LOSS DATA TRANSMISSION METHOD FOR HIGH-POWER INDUCTION-TYPE POWER SUPPLY SYSTEM

(75) Inventors: Ming-Chiu Tsai, New Taipei (TW); Chi-Che Chan, New Taipei (TW)

(73) Assignee: Fu Da Tong Technology Co., Ltd., Zhonghe Dist., New Taipei (TW)

(*) Notice: Subject to any disclaimer, the term of this patent is extended or adjusted under 35 U.S.C. 154(b) by 469 days.

(21) Appl. No.: 13/427,715

(22) Filed: Mar. 22, 2012

(65) Prior Publication Data

US 2012/0193998 A1 Aug. 2, 2012

Related U.S. Application Data

(63) Continuation-in-part of application No. 13/154,965, filed on Jun. 7, 2011, now Pat. No. 8,810,072.

(30) Foreign Application Priority Data

Feb. 1, 2011 (TW) .................................. 100103836

(51) Int. Cl.
*H01F 38/00* (2006.01)
*H04L 1/24* (2006.01)

(52) U.S. Cl.
CPC ...................................... *H04L 1/243* (2013.01)
USPC ........... 307/104; 307/149; 307/151; 320/108; 713/300; 713/340

(58) Field of Classification Search
CPC .......... H01F 38/14; H04L 1/243; H02J 17/00; H02J 5/005; H02J 7/025

USPC .......... 307/104, 149, 151; 320/108; 713/300, 713/340
See application file for complete search history.

(56) References Cited

U.S. PATENT DOCUMENTS

| 5,734,254 | A  | * | 3/1998  | Stephens ........................ 320/106 |
|-----------|----|---|---------|-------------------------------------------|
| 6,122,329 | A  | * | 9/2000  | Zai et al. ....................... 375/329 |
| 6,154,375 | A  |   | 11/2000 | Majid                                     |
| 6,184,651 | B1 | * | 2/2001  | Fernandez et al. ............ 320/108      |
| 6,345,203 | B1 | * | 2/2002  | Mueller et al. .................. 607/60   |
| 7,791,311 | B2 | * | 9/2010  | Sagoo ........................... 320/108   |
| 7,847,438 | B2 | * | 12/2010 | Jin et al. ........................ 307/104 |
| 8,004,235 | B2 | * | 8/2011  | Baarman et al. .............. 320/108       |
| 8,098,043 | B2 |   | 1/2012  | Lin                                       |

(Continued)

FOREIGN PATENT DOCUMENTS

| CN | 101272063 B | 1/2012 |
|----|-------------|--------|
| CN | 102315692 A | 1/2012 |

(Continued)

*Primary Examiner* — Jared Fureman
*Assistant Examiner* — Alfonso Perez Borroto
(74) *Attorney, Agent, or Firm* — Winston Hsu; Scott Margo

(57) ABSTRACT

A low-loss data transmission method used in a high-power induction-type power supply system consisting of a supplying-end module and a receiving-end module is disclosed. The supplying-end microprocessor of the supplying-end module has built-in anti-noise signal analysis software that can remove noises from the data signal fed back by the receiving-end module, assuring high stability of the transmission of data signal and reducing energy dissipation of data transmission. Subject to a special circuit arrangement of the receiving-end coil of the receiving-end module, signal modulation is performed on a low voltage DC square wave, assuring a high level of stability of the supplying of power supply to the receiving-end module.

7 Claims, 13 Drawing Sheets

(56) References Cited

U.S. PATENT DOCUMENTS

| | | | |
|---|---|---|---|
| 8,183,827 B2 * | 5/2012 | Lyon | 320/108 |
| 8,188,619 B2 * | 5/2012 | Azancot et al. | 307/104 |
| 8,217,535 B2 | 7/2012 | Uchida et al. | |
| 8,217,621 B2 | 7/2012 | Tsai et al. | |
| 8,248,024 B2 | 8/2012 | Yuan et al. | |
| 8,358,103 B2 | 1/2013 | Eastlack | |
| 8,373,387 B2 | 2/2013 | Bourilkov et al. | |
| 8,412,963 B2 | 4/2013 | Tsai et al. | |
| 8,417,359 B2 | 4/2013 | Tsai et al. | |
| 8,541,975 B2 * | 9/2013 | Park et al. | 320/108 |
| 8,772,979 B2 * | 7/2014 | Tsai et al. | 307/104 |
| 2007/0177533 A1 | 8/2007 | Palay | |
| 2008/0079392 A1 * | 4/2008 | Baarman et al. | 320/108 |
| 2009/0009006 A1 | 1/2009 | Jin | |
| 2009/0033294 A1 | 2/2009 | Odajima | |
| 2009/0174263 A1 * | 7/2009 | Baarman et al. | 307/104 |
| 2009/0267561 A1 | 10/2009 | Lin | |
| 2010/0007307 A1 * | 1/2010 | Baarman et al. | 320/108 |
| 2010/0279606 A1 | 11/2010 | Hillan | |
| 2011/0158329 A1 | 6/2011 | Oettinger | |
| 2011/0159812 A1 | 6/2011 | Kim | |
| 2011/0176589 A1 | 7/2011 | Kolof | |
| 2011/0204723 A1 | 8/2011 | Irish | |
| 2011/0285212 A1 | 11/2011 | Higuma | |
| 2013/0234532 A1 | 9/2013 | Fells | |

FOREIGN PATENT DOCUMENTS

| | | |
|---|---|---|
| CN | 102710409 A | 10/2012 |
| CN | 103425169 A | 12/2013 |
| TW | M246884 | 10/2004 |
| TW | 200527302 | 8/2005 |
| TW | 201018042 | 5/2010 |
| TW | 201123673 | 7/2011 |
| TW | 201123676 | 7/2011 |
| TW | 201128972 | 8/2011 |
| TW | 201138258 | 11/2011 |
| TW | 201234871 | 8/2012 |
| TW | 201243281 | 11/2012 |
| TW | 201315082 | 4/2013 |

* cited by examiner

US 8,981,600 B2

LOW-LOSS DATA TRANSMISSION METHOD FOR HIGH-POWER INDUCTION-TYPE POWER SUPPLY SYSTEM

CROSS REFERENCE TO RELATED ART

This application is a Continuation-In-Part of application Ser. No. 13/154,965, filed on Jun. 7, 2011, now pending. The patent application identified above is incorporated here by reference in its entirety to provide continuity of disclosure.

BACKGROUND OF THE INVENTION

1. Field of the Invention

The present invention relates to power supplying technology and more particularly, to a low-loss data transmission method for high-power induction-type power supply system, which allows for transmission of power supply and data signal at the same time, assuring a high level of stability of the supplying of power supply and reducing energy dissipation of signal transmission.

2. Description of the Related Art

Following fast development of electronic and internet technology, many digitalized electronic products, such as digital camera, cellular telephone, multimedia player (MP3, MP4) and etc., have been continuously developed and have appeared on the market. These modern digital electronic products commonly have light, thin, short and small characteristics. However, for high mobility, power supply is an important factor. A mobile digital electronic product generally uses a rechargeable battery to provide the necessary working voltage. When power is low, the rechargeable battery can be recharged. For charging the rechargeable battery of a digital electronic product, a battery charger shall be used. However, it is not economic to purchase a respective battery charger when buying a new mobile electronic product. Further, when one spends a big amount of money to purchase different mobile electronic products, a special storage space is necessary for the storage of the mobile electronic products. Further, it is inconvenient to carry and store many different mobile electronic products and the related battery chargers.

Further, when using a battery charger to charge a mobile electronic apparatus, the user must connect the connection interface (plug) of the battery charger to an electric outlet and then connect the connector at the other end of the battery charger to the mobile electronic apparatus, enabling the mobile electronic apparatus to be charged. After charging, the mobile electronic apparatus is disconnected from the battery charger. As conventional battery chargers can be used in a place where an electric outlet is available, the application of conventional battery chargers is limited. When in an outdoor space, conventional battery chargers cannot be used for charging mobile electronic apparatuses.

Further, except battery charging, a mobile electronic apparatus may need to make setting of related functions, data editing or data transmission. A user may directly operate the mobile electronic apparatus to make function setting or to input data. However, some mobile electronic apparatus (such as MP3 player, MP4 player, digital camera, electronic watch, mobile game machine, wireless game grip, wireless controller) do not allow direct setting or data transmission. When making function setting or data transmission, an external electronic device (such as computer, PDA) must be used. Further, when charging a mobile electronic apparatus, it may be not operable to transmit data. Further, wireless induction power supply systems (or the so-called wireless chargers) are commercially available. These wireless induction power supply systems commonly use two coils, one for emitting power supply and the other for receiving power supply. However, the energy of wireless power supply is dangerous and will heat metal objects. They work like an electromagnetic stove. The use of a wireless induction power supply system has the risk of overheat damage of the charged device.

To overcome the problem conventional techniques that do not allow for transmission of data signal during charging, the applicant of the present invention invented a data transmission method for high-power induction-type power supply system. This invention was filed for patent on Feb. 1, 2011 under application number 100103836, and published on Jul. 1, 2011 under publication number 201123676. Subject induction between a supplying-end coil of a supplying-end module and a receiving-end coil of a receiving-end module, this method allows for transmission of power supply and data signal at the same time and has the characteristics of low energy dissipation, high data signal clarity and high fault tolerance. However, the modulation operation of the amplitude modulation circuit of the receiving-end module consumes a large amount of electric current. In actual wireless charging operation, this method has drawbacks as follows:

1. During signal modulation of the amplitude modulation circuit of the receiving-end module, a high voltage is obtained from the capacitor A3 of the resonant circuit and transmitted through a MOSFET component to the ground (GND). Because of high voltage, a large current is transmitted, causing significant energy dissipation at the coil and drop of waveform of the data signal decoded by the signal analysis circuit 13 (see the drop on the middle part of the waveform numbered by 3 in FIG. 12), and therefore the power receiving ability of the receiving-end module during this stage is weakened.

2. When the amplitude modulation circuit A1 of the receiving-end module A modulates a data signal (see FIG. 13), a large current of high voltage passes through the MOSFET component A11, and the MOSFET component A11 may be burned out by the large current of high voltage, shortening the lifespan of the receiving-end module A.

3. When the amplitude modulation circuit A1 of the receiving-end module A modulates a data signal, the rectifier A2 of the receiving-end module A provides a shortcut so that AC current can be directly transmitted to the receiving-end coil A4 without through the resonant circuit A3 (resonant capacitor), assuring high clarity of the feedback signal generated by the receiving-end coil A4. However, this condition causes a temporary interruption of power supply at the power loop behind the resonant circuit A3 when the receiving-end module A is modulating a data signal, resulting in instability of power output of the power output terminal A5 during the data signal modulation period.

The definitions of the reference numerals at the left side in FIG. 12 (please also refer to FIG. 13) are explained as follows:
1: Control signal of N-type MOSFET component A11.
2: Control signal of N-type MOSFET component A12.
3: Output signal of signal analysis circuit.
4: Signal of supplying-end microprocessor after interpretation.

Therefore, it is desirable to have a data transmission method for high-power induction-type power supply system that eliminates the problem of power supply interruption or loss during signal modulation operation of the amplitude modulation circuit of the receiving-end module of the aforesaid prior art design, and the problem of the conduction of a large current of high voltage to burn the MOSFET component during the signal modulation operation of the amplitude modulation circuit.

SUMMARY OF THE INVENTION

The present invention has been accomplished under the circumstances in view. It is one object of the present invention to provide a low-loss data transmission method, which is practical for use in a high-power induction-type power supply system, allowing for transmission of power supply and data signal at the same time, assuring a high level of stability of the supplying of power supply and reducing energy dissipation of signal transmission.

To achieve this and other objects of the present invention, a low-loss data transmission method is used in a high-power induction-type power supply system consisting of a supplying-end module and a receiving-end module. The supplying-end module comprises a supplying-end microprocessor, a power driver unit, a signal analysis circuit, a coil voltage detection circuit, a display unit, a power supplying unit, a resonant circuit and a supplying-end coil. The power driver unit, the signal analysis circuit, the coil voltage detection circuit, the display unit and the power supplying unit are respectively electrically coupled to the supplying-end microprocessor. The power driver unit comprises a MOSFET driver, a high-end MOSFET component and a low-end MOSFET component. The MOSFET driver is electrically coupled with the supplying-end microprocessor. The high-end MOSFET component and the low-end MOSFET component are respectively electrically coupled with the resonant circuit. The high-end MOSFET component is also electrically coupled with the power supplying unit and the resonant circuit. The signal analysis circuit comprising a rectifier diode electrically coupled with the resonant circuit, a series of resistors electrically connected in series to the rectifier diode and a plurality of capacitors electrically connected in parallel to the series of resistors. The coil voltage detection circuit consists of resistors and capacitors. The power supplying unit is also electrically coupled with the power driver unit, comprising a power source, two current sensing shunt resistors electrically connected in series to the power source and a DC-DC buck converter electrically connected to the power source. The supplying-end coil is electrically coupled with the resonant circuit for transmitting power supply and data signal wirelessly. The receiving-end module comprises a receiving-end microprocessor, a voltage detection circuit electrically coupled to the receiving-end microprocessor, a rectifier and filter circuit electrically coupled to the receiving-end microprocessor, an amplitude modulation circuit electrically coupled to the receiving-end microprocessor, a protection circuit breaker electrically coupled to the receiving-end microprocessor, a voltage stabilizer circuit electrically coupled to the receiving-end microprocessor, a DC-DC buck converter electrically coupled to the receiving-end microprocessor, and a resonant circuit and a receiving-end coil electrically connected in parallel to a rectifier of the rectifier and filter circuit. The receiving-end coil is electrically connected with said amplitude modulation circuit in series.

Further, the supplying-end microprocessor of the supplying-end module has built therein operating, control and anti-noise signal analysis software and a voltage comparator. The built-in anti-noise signal analysis software can remove noises from the data signal fed back by the receiving-end module to the supplying-end module, assuring high stability of the transmission of data signal and reducing energy dissipation of data transmission.

Further, the receiving-end module is so arranged that the receiving-end coil of the receiving-end module has one end thereof electrically connected to the ground (GND) through the resistor (or inductor) and N-type MOSFET component of the amplitude modulation circuit and also connected to one end of the rectifier of the rectifier and filter circuit, and the other end thereof connected to the other end of the rectifier through the resonant circuit. Thus, signal modulation is performed on a low voltage DC square wave, avoiding burning of the N-type MOSFET component of the amplitude modulation circuit during transmitting of power supply from the supplying-end coil of the supplying-end module to the receiving-end coil and assuring a high level of stability of the supplying of power supply to the receiving-end module.

DETAILED DESCRIPTION OF THE PREFERRED EMBODIMENT

Figure 1:
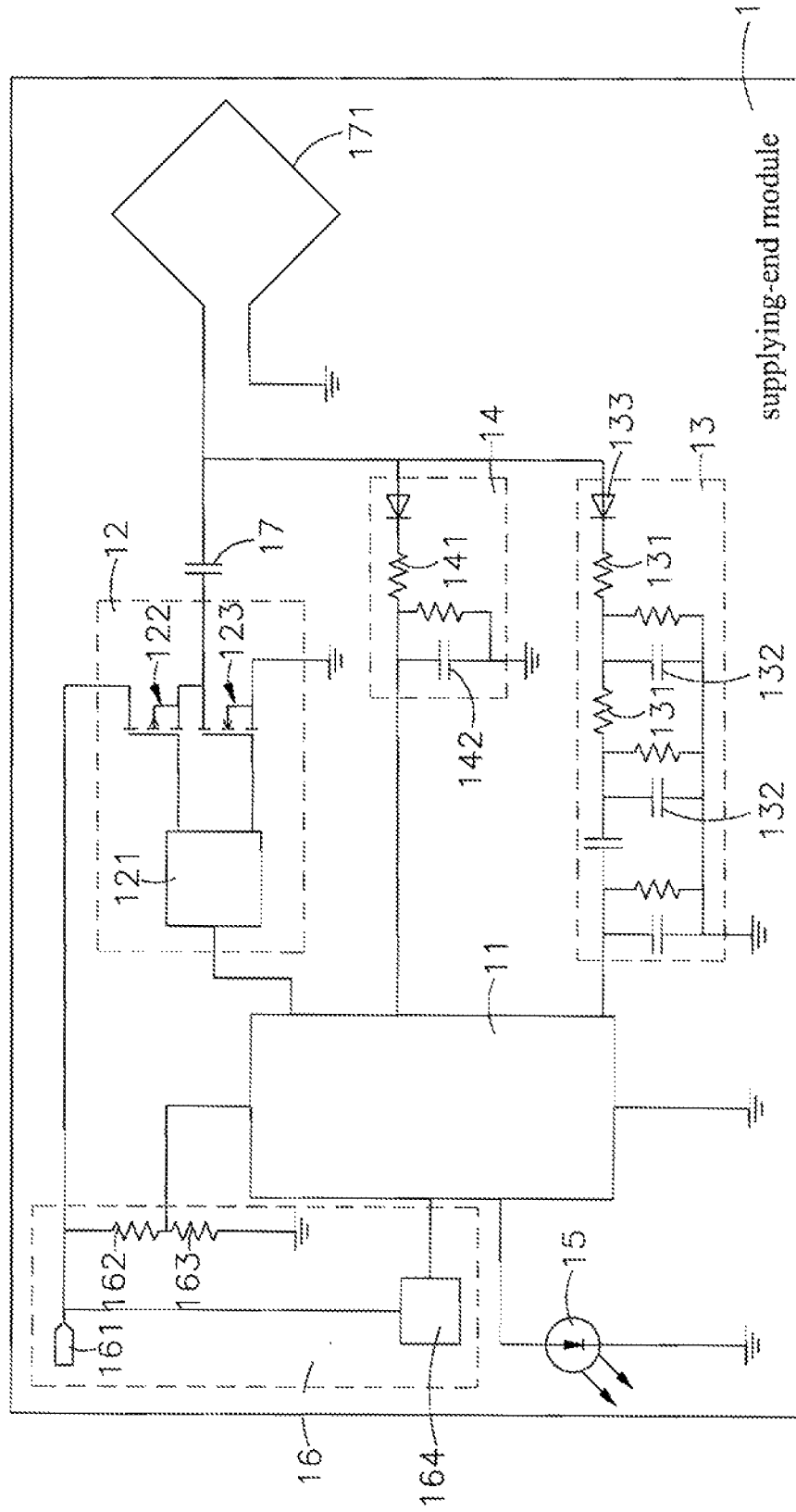
FIG. 1 is a circuit block diagram of a supplying-end module for high-power induction-type power supply system in accordance with the present invention.
Figure 2:
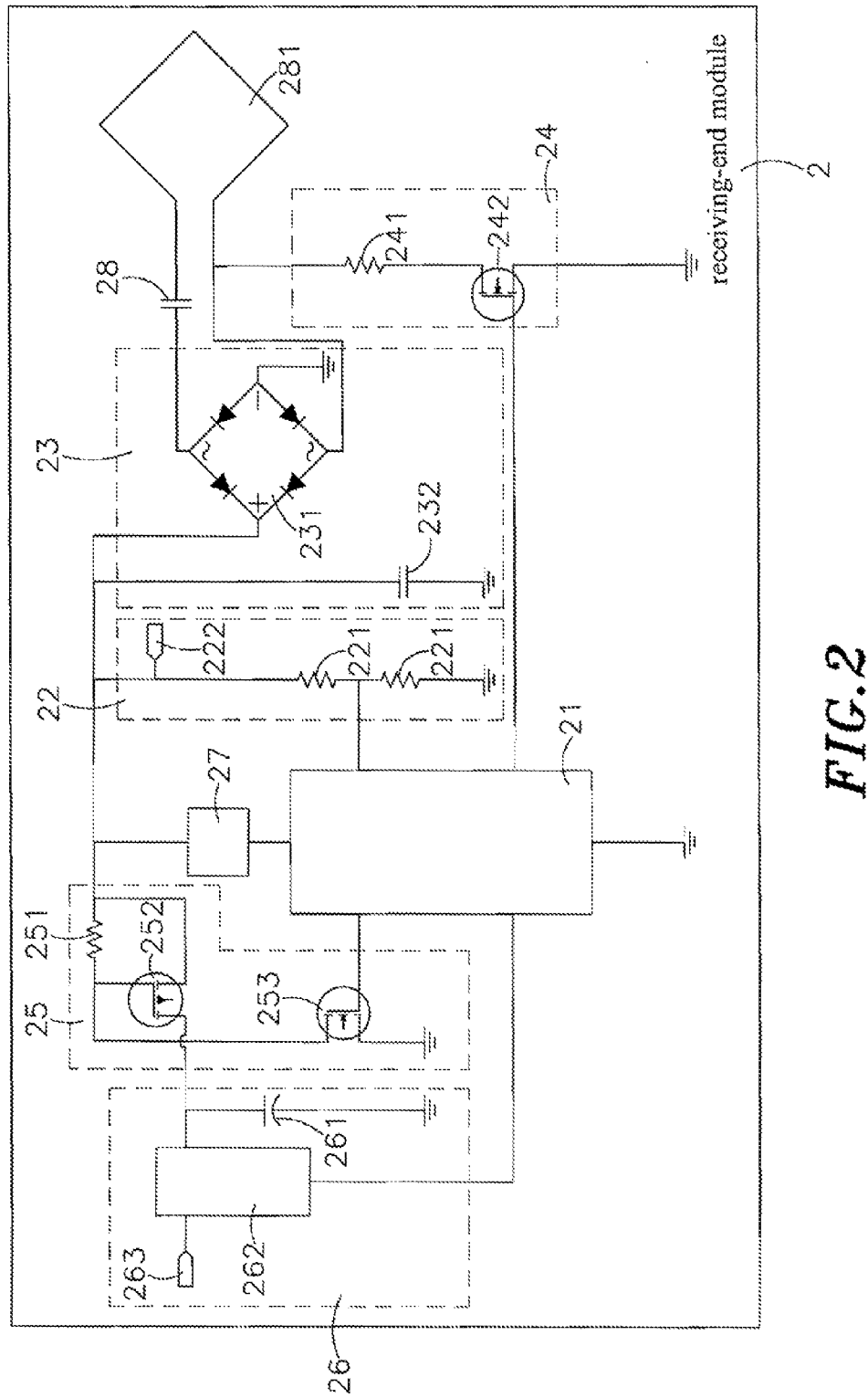
FIG. 2 is a circuit block diagram of a receiving-end module for high-power induction-type power supply system in accordance with the present invention.
Figure 3:
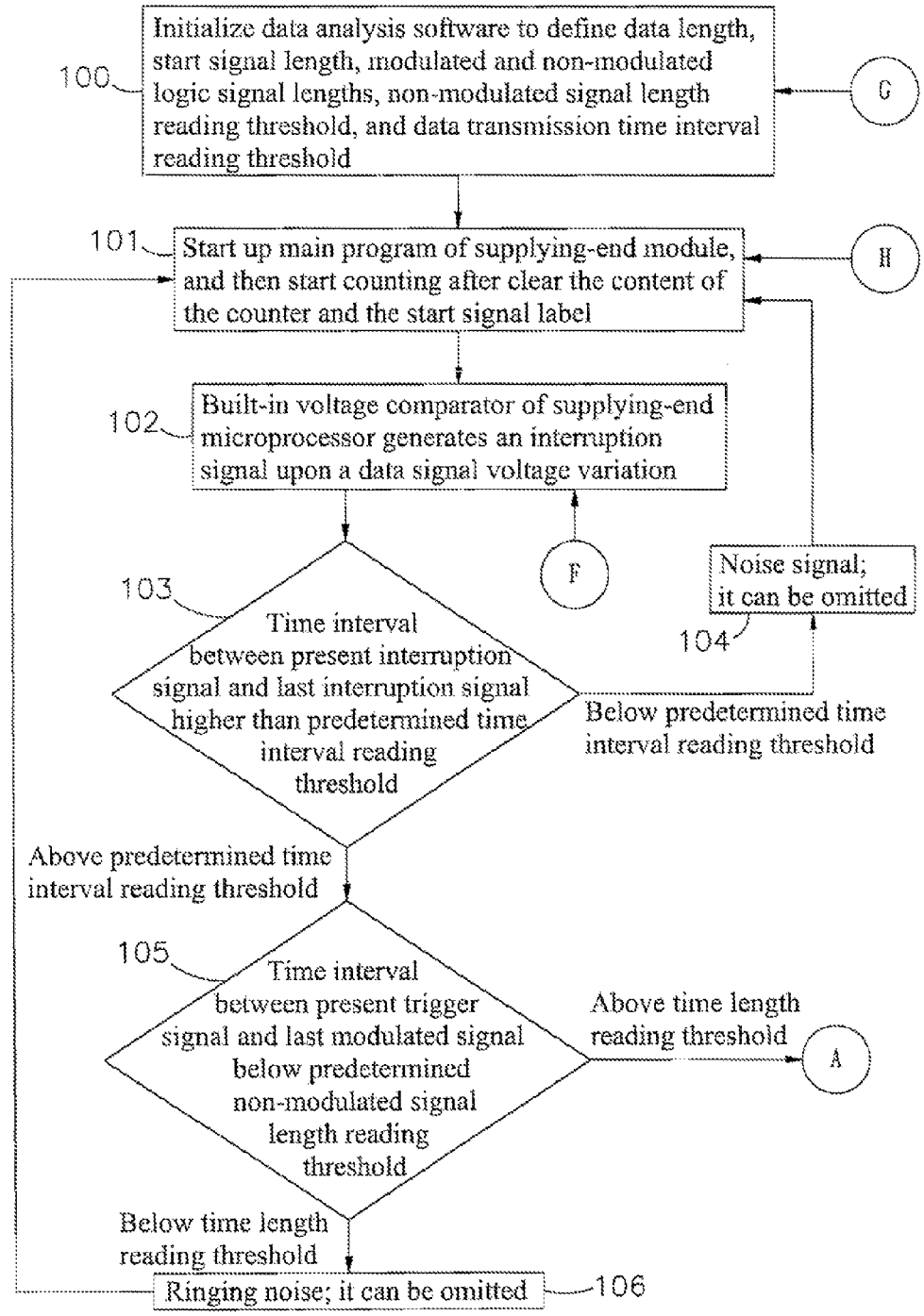
FIG. 3 is an operation flow chart of the low-loss data transmission method for high-power induction-type power supply system in accordance with the present invention (I).
Figure 4:
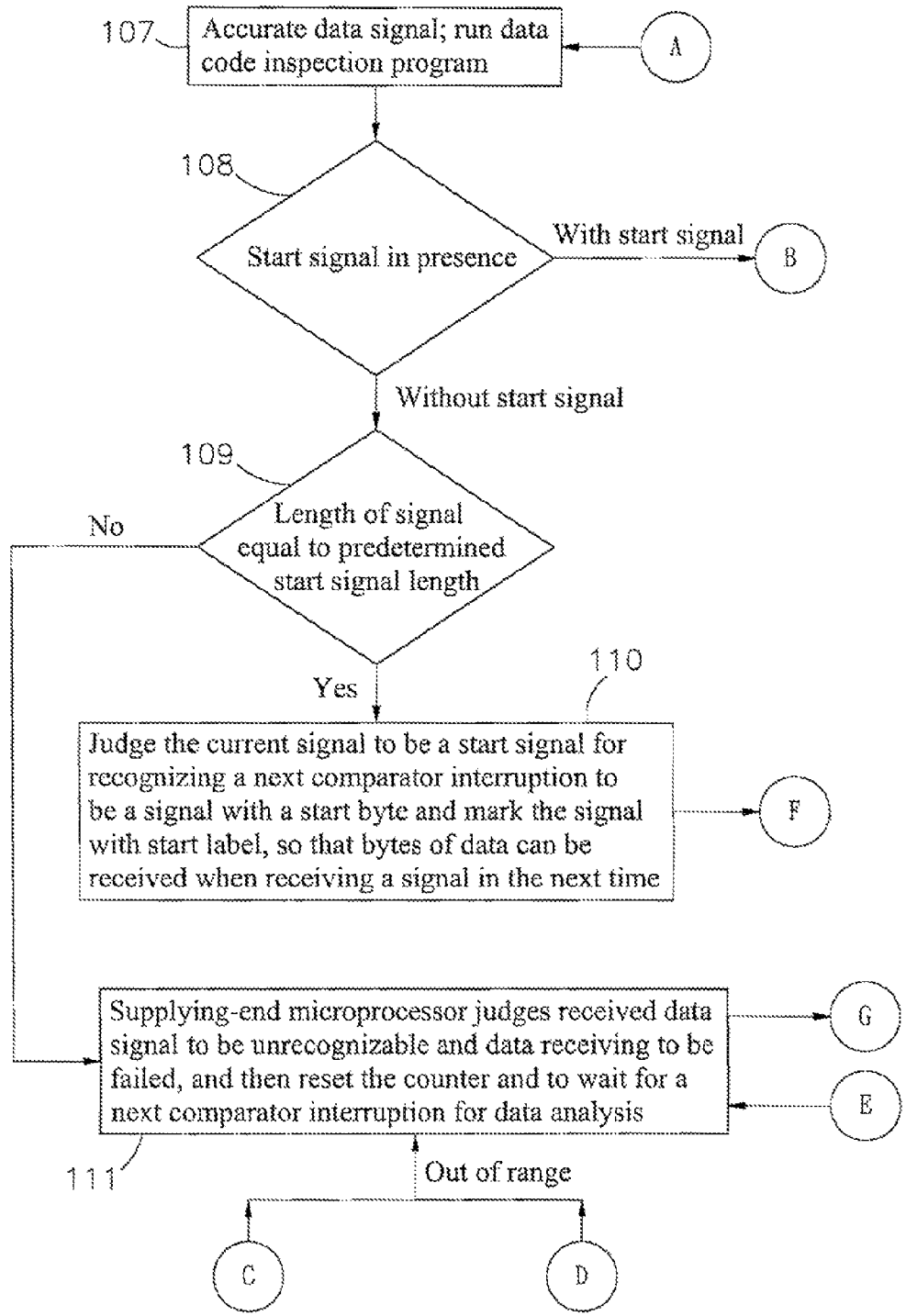
FIG. 4 is an operation flow chart of the low-loss data transmission method for high-power induction-type power supply system in accordance with the present invention (II).
Figure 5:
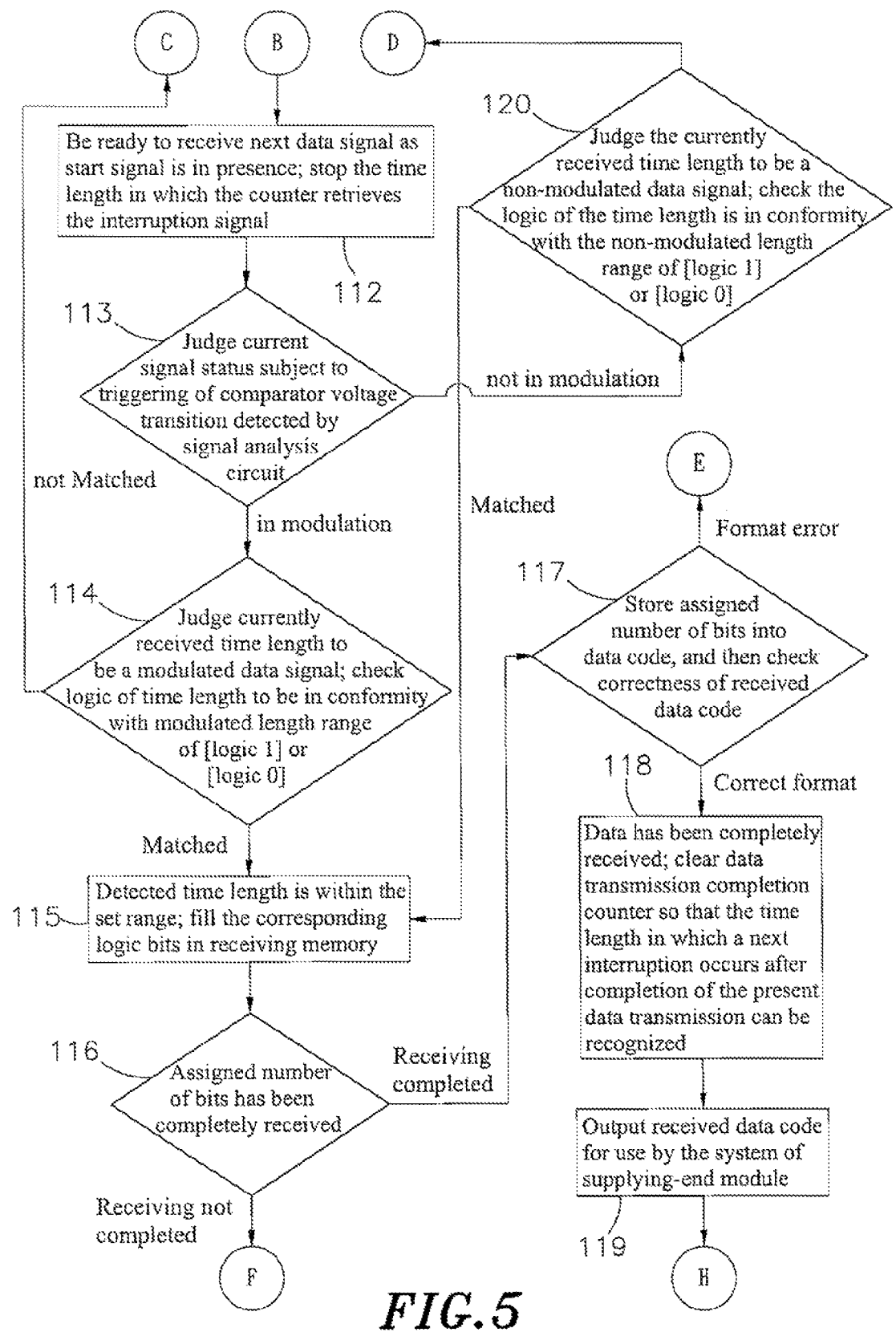
FIG. 5 is an operation flow chart of the low-loss data transmission method for high-power induction-type power supply system in accordance with the present invention (III).

Referring to FIGS. 1-5, a low-loss data transmission method in accordance with the present invention is used in a high-power induction-type power supply system. The high-power induction-type power supply system comprises a supplying-end module 1 and a receiving-end module 2.

The supplying-end module 1 comprises a supplying-end microprocessor 11 having installed therein operating, control, anti-noise signal analysis and other related software and a voltage comparator, a power driver unit 12, a signal analysis circuit 13, a coil voltage detection circuit 14, a display unit 15, a power supplying unit 16, a resonant circuit 17 and a supplying-end coil 171. The power driver unit 12, the signal analysis circuit 13, the coil voltage detection circuit 14, the display unit 15 and the power supplying unit 16 are respectively electrically coupled to the supplying-end microprocessor 11. The power driver unit 12 comprises a MOSFET (Metal-Oxide-Semiconductor Field-Effect Transistor) driver 121, a high-end MOSFET component 122 and a low-end MOSFET component 123. The MOSFET driver 121 is electrically coupled with the supplying-end microprocessor 11, the high-end MOSFET component 122 and the low-end MOSFET component 123. The high-end MOSFET component 122 and the low-end MOSFET component 123 are respectively electrically coupled with the resonant circuit 17. The high-end MOSFET component 122 is also electrically coupled with the power supplying unit 16 and the resonant circuit 17. The signal analysis circuit 13 comprises a rectifier diode 133 electrically coupled with the resonant circuit 17, a series of resistors 131 electrically connected in series to the rectifier diode 133, and a plurality of capacitors 132 electrically connected in parallel to the series of resistors 131. The coil voltage detection circuit 14 consists of resistors 141 and capacitors 142. The power supplying unit 16 is also electrically coupled with the power driver unit 12, comprising a power source 161, two current sensing shunt resistors 162; 163 electrically connected in series to the power source 161, and a DC-DC buck converter 164 electrically connected to the power source 161. The supplying-end coil 171 is electrically coupled with the resonant circuit 17, and adapted for transmitting power supply and data signal wirelessly.

The receiving-end module 2 comprises a receiving-end microprocessor 21 having installed therein operating, control and other related software, a voltage detection circuit 22, a rectifier and filter circuit 23, an amplitude modulation circuit 24, a protection circuit breaker 25, a voltage stabilizer circuit 26, a DC-DC buck converter 27, a resonant circuit 28 and a receiving-end coil 281. The voltage detection circuit 22, the rectifier and filter circuit 23, the amplitude modulation circuit 24, the protection circuit breaker 25, the voltage stabilizer circuit 26 and the DC-DC buck converter 27 are respectively electrically coupled with the receiving-end microprocessor 21. The voltage detection circuit 22 comprises a plurality of resistors 221 electrically connected in series to the receiving-end microprocessor 21, and sensing points 222 electrically connected with the resistors 221, the rectifier and filter circuit 23, the protection circuit breaker 25 and the DC-DC buck converter 27 in series. The rectifier and filter circuit 23 comprises a rectifier 231 and a filter capacitor 232 respectively electrically connected in parallel to the voltage detection circuit 22, the protection circuit breaker 25 and the DC-DC buck converter 27. The resonant circuit 28 and the receiving-end coil 281 are electrically connected in parallel to the rectifier 231 of the rectifier and filter circuit 23. The receiving-end coil 281 is electrically connected with the amplitude modulation circuit 24 in series. The amplitude modulation circuit 24 comprises a resistor (or inductor) 241 and an N-type MOSFET component 242. The resistor (or inductor) 241 and the N-type MOSFET component 242 are electrically connected in series. The protection circuit breaker 25 comprises a resistor 251, a P-type MOSFET component 252 and an N-type MOSFET component 253. The resistor 251, the P-type MOSFET component 252 and the N-type MOSFET component 253 are electrically connected in series. Further, the N-type MOSFET component 253 is electrically coupled with the receiving-end microprocessor 21. The voltage stabilizer circuit 26 comprises a buffer capacitor 261, a DC-DC step-down converter 262 and a power output terminal 263. The P-type MOSFET component 252 is electrically connected with the buffer capacitor 261 and DC-DC step-down converter 262 of the voltage stabilizer circuit 26. The voltage detection circuit 22, the protection circuit breaker 25 and the DC-DC buck converter 27 are respectively electrically coupled with the rectifier and filter circuit 23. The rectifier and filter circuit 23 and the amplitude modulation circuit 24 are respectively electrically coupled with the resonant circuit 28, which is electrically coupled with the receiving-end coil 281.

Subject to the functioning of the amplitude modulation circuit 24 and the protection circuit breaker 25, the receiving-end microprocessor 21 of the receiving-end module 2 achieves controls of data signal. Subject to the functioning of the voltage stabilizer circuit 26, the receiving-end microprocessor 21 stabilizes transmission of data signal. Further, during transmission of power supply, transmission of data code of data signal is stabilized subject to the performance of the built-in data analysis software of the supplying-end microprocessor 11, and the related power loss is minimized. Further, any change of load current due to the use of the receiving-end module 2 in a different mobile electronic apparatus (such as, cell phone, PDA, notebook, digital camera, MP3 player, MP4 player, palmtop game machine, etc.) does not affect the data code analysis performance of the supplying-end microprocessor 11. Further, the receiving-end module 2 has its power conversion circuit and its data transmission circuit separately arranged for independent operation, enhancing system power transmission capability.

When operating the supplying-end module 1 and receiving-end module 2 of the high-power induction-type power supply system to transmit power supply and data signal to a predetermined electronic apparatus, the high-power induction-type power supply system runs subject to the following steps:

(100) Initialize the data analysis software to define data length, start signal length, modulated and non-modulated logic signal lengths, non-modulated signal length reading threshold, and data transmission time interval reading threshold.

(101) Start up the main program of the supplying-end module 1, and then start counting after clear the content of the counter and the start signal label.

(102) The built-in voltage comparator of the supplying-end microprocessor 11 generates an interruption signal upon a data signal voltage variation.

(103) Determine whether or not the time interval between the generation of the present interruption signal and the generation of the last interruption signal is higher than the predetermined time interval reading threshold? And then proceed to step (104) when the time interval is lower than the predetermined time interval reading threshold, or step (105) when the time interval is higher than the predetermined time interval reading threshold.

(104) The signal is determined to be a noise signal but not a data signal provided by the receiving-end module 2 and can be omitted, and then return to step (101).

(105) Examine the time interval between the present trigger signal and the last modulated signal and then proceed to step (106) if this time interval is below the predetermined non-modulated signal length reading threshold, or step (107) if this time interval surpasses the non-modulated signal length reading threshold.

(106) The signal is determined to be a ringing noise and can be omitted, and then return to step (101).

(107) The signal is determined to be an accurate data signal, and then run the data code inspection program.

(108) Examine whether or not a start signal is in presence? And then proceed to step (112) when a start signal is in presence, or step (109) when no start signal is in presence.

(109) Examine whether or not the length of the signal is equal to the predetermined start signal length, and then proceed to step (110) when positive, or step (111) when negative.

(110) Judge the current signal to be a start signal for recognizing a next comparator interruption to be a signal with a start byte and mark the signal with start label, so that bytes of data can be received when receiving a signal in the next time, and then return to step (102) to wait for a next interruption.

(111) The supplying-end microprocessor 11 judges the received data signal to be unrecognizable and the data receiving to be failed, and then return to step (100) to reset the counter and to wait for a next comparator interruption for data analysis.

(112) Be ready to receive a next data signal as a start signal is in presence; stop the time length in which the counter retrieves the interruption signal.

(113) Judge the current signal status subject to triggering of the comparator voltage transition detected by the signal analysis circuit 13, and then proceed to step (114) if the signal is a modulated signal, or step (120) if the signal is not a modulated signal.

(114) Judge the currently received time length to be a modulated data signal; check the logic of the time length to be in conformity with the modulated length range of [logic 1] or [logic 0], and then proceed to step (115) when in conformity, or return to step (111) when not in conformity.

(115) The detected time length is within the set range; fill the corresponding logic bits in the receiving memory, and then proceed to step (116).

(116) Check whether or not the assigned number of bits has been completely received, and then return to step (102) to wait for a next comparator interruption when negative, or proceed to step (117) when positive.

(117) Store the assigned number of bits into a data code, and then check the correctness of the received data code, and then proceed to step (118) if the data code is correct, or return to step (111) if the data code is incorrect.

(118) Data has been completely received; clear the data transmission completion counter so that the time length in which a next interruption occurs after completion of the present data transmission can be recognized.

(119) Output the received data code for use by the system of the supplying-end module 1, and then return to step (101) to wait for a next data signal.

(120) Judge the currently received time length to be a non-modulated data signal; check the logic of the time length is in conformity with the non-modulated length range of [logic 1] or [logic 0], and then return to step (115) when in conformity, or return to step (111) when not in conformity.

During the operation of the aforesaid high-power induction-type power supply system to supply power supply and to transmit data signal at the same time, the amplitude modulation circuit 24 of the receiving-end module 2 drives the receiving-end coil 281 to transmit a feedback signal to the supplying-end coil 171 of the supplying-end module 1. The feedback signal is decoded by the signal analysis circuit 13 and then transmitted to the supplying-end microprocessor 11 of the supplying-end module 1 for analysis by the built-in anti-noise signal analysis software of the supplying-end microprocessor 11, assuring high stability of the transmission of power supply and data signal and reducing energy dissipation of signal transmission. In case of output load instability at the power output terminal 263 of the voltage stabilizer circuit 26 to interfere with the feedback signal of the receiving-end coil 281 of the receiving-end module 2, the built-in anti-noise signal analysis software of the supplying-end microprocessor 11 can still accurately analyze the data code of the interfered feedback signal, enabling the power supplying unit 16 of the supplying-end module 1 to stably control system operation and to continuously supply high-power energy to the receiving-end module 2 for output by the power output terminal 263 to the external device after power conversion.

Further, the signal transmitted by the amplitude modulation circuit 24 of the receiving-end module 2 to the ground terminal (GND) is a low voltage DC square wave, and therefore, the N-type MOSFET component 242 of the amplitude modulation circuit 24 will not burn out easily. Further, because the amplitude modulation circuit 24 is not electrically connected between the resonant circuit 28 and the receiving-end coil 281, signal modulation at the amplitude modulation circuit 24 neither affects the power supply receiving capability of the receiving-end module 2 nor causes a short circuit in the loop of the receiving-end coil 281. Further, during transmission of a modulated signal from the amplitude modulation circuit 24 to the supplying-end module 1, a ringing noise may occur. Subject to the scheduling of the built-in anti-noise signal analysis software of the supplying-end microprocessor 11, any signal that contains ringing noises or noises generated due to variation of the load at the receiving-end module 2 will be eliminated.

Figure 6:
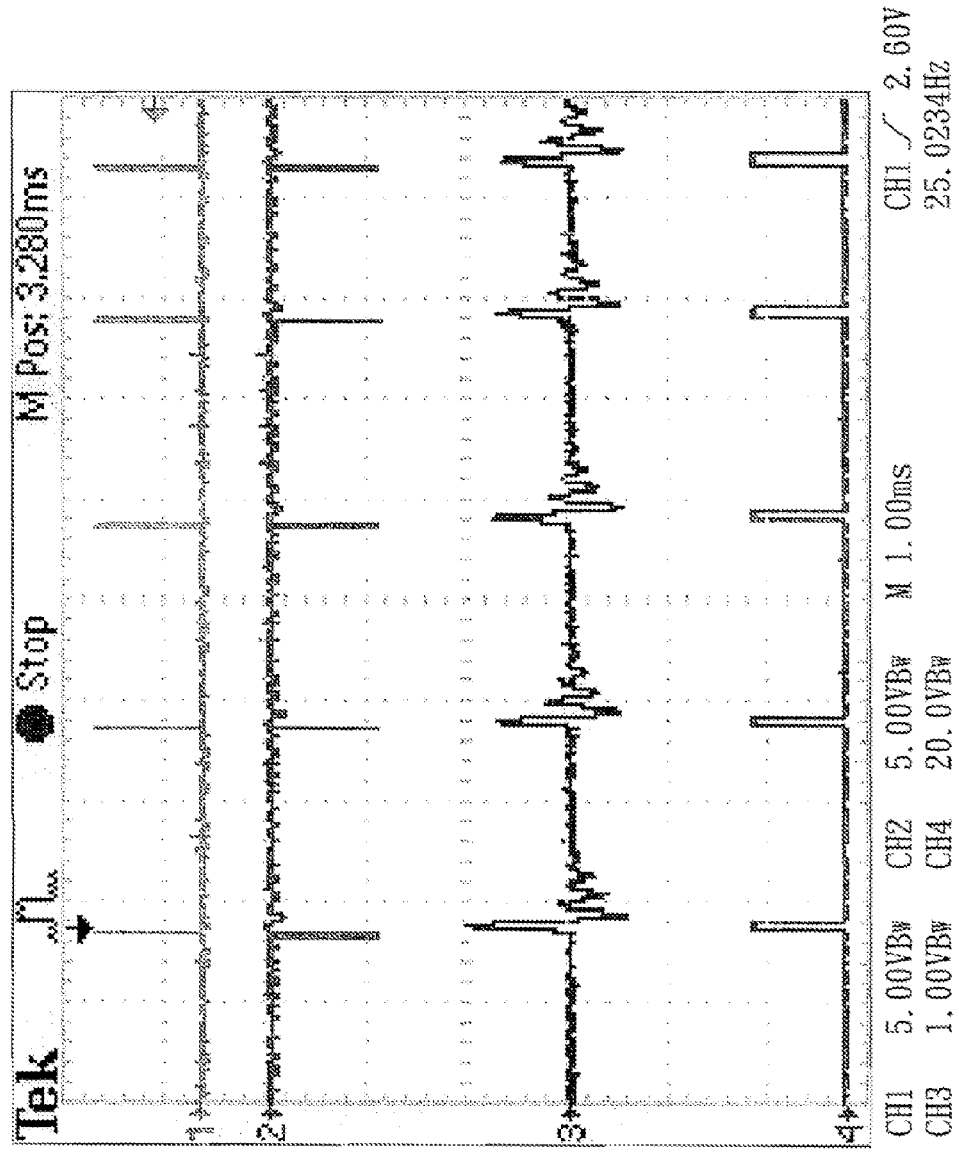
FIG. 6 is a waveform chart of a high power output data code in accordance with the present invention (I).
Figure 7:
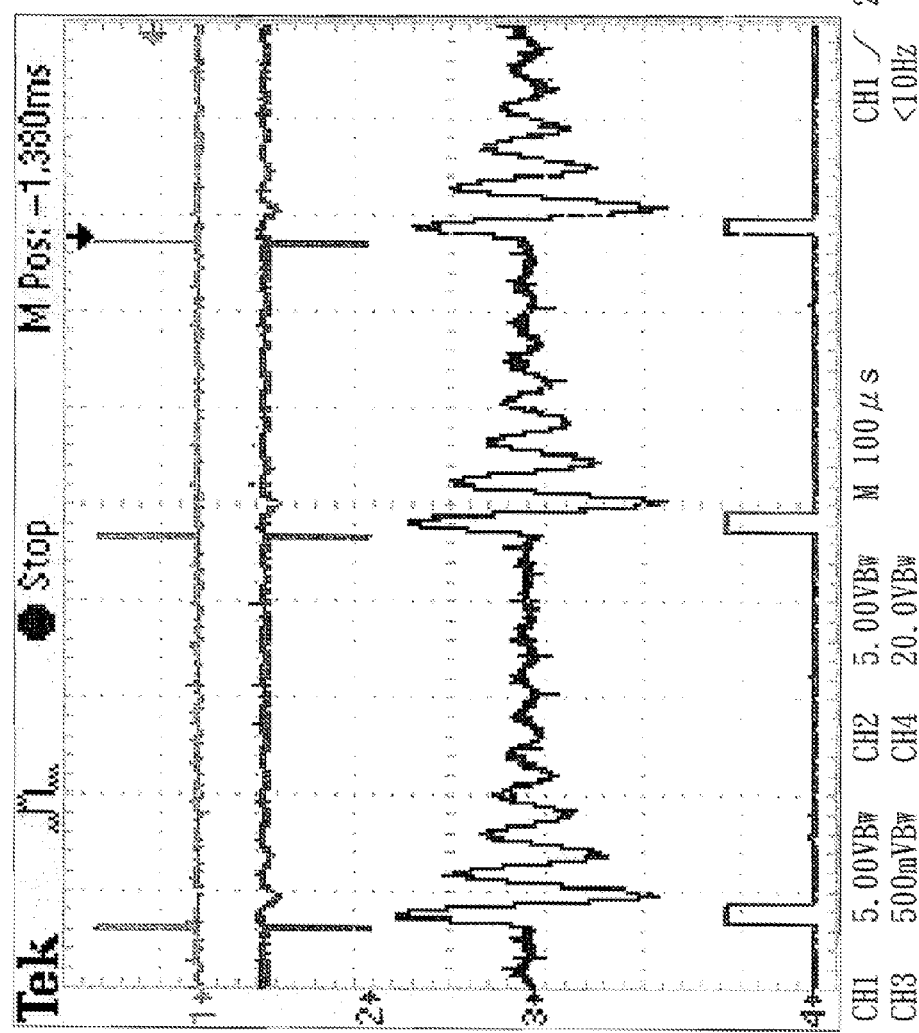
FIG. 7 is a waveform chart of a high power output data code in accordance with the present invention (II).
Figure 8:
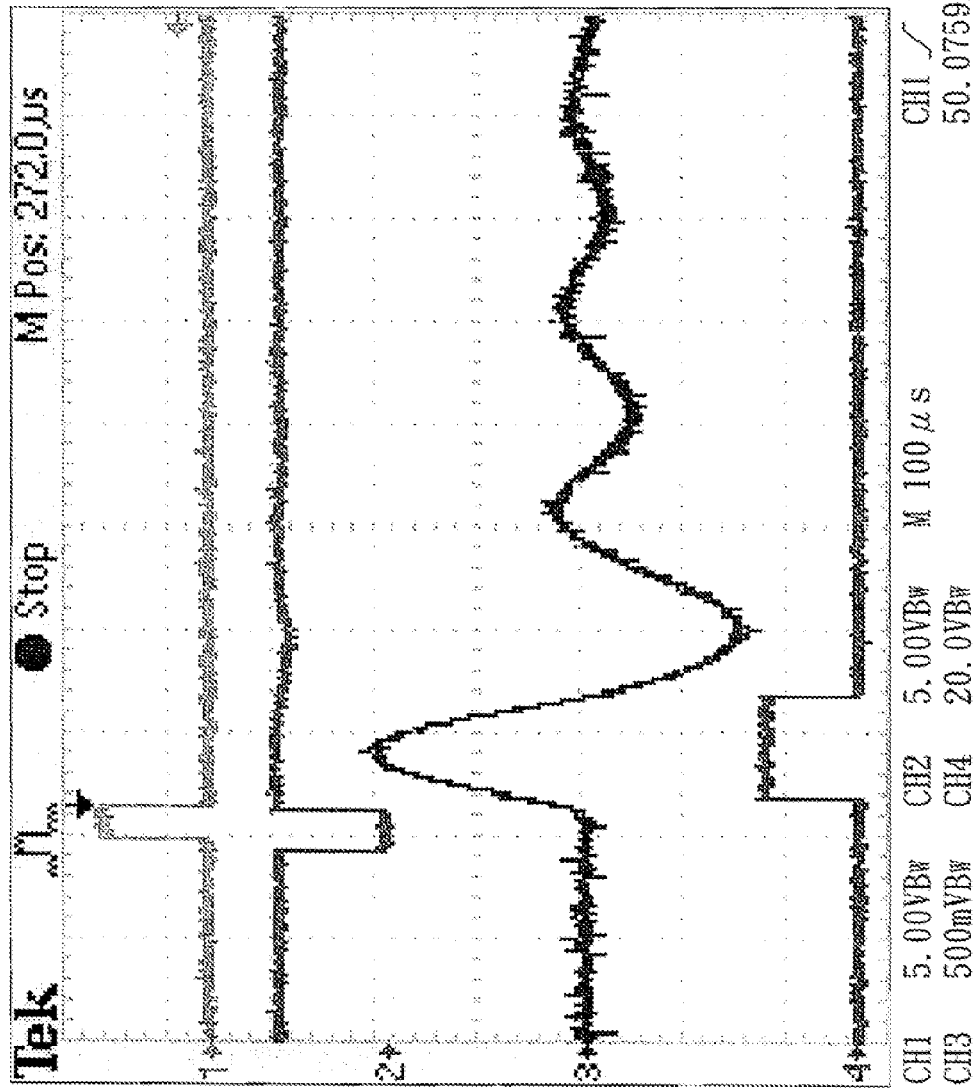
FIG. 8 is a waveform chart of a high power output data code in accordance with the present invention (III).

Referring to FIGS. 6, 7 and 8, during the operation of the high-power induction-type power supply system, the supplying-end module 1 provides power supply to the receiving-end module 2, and the receiving-end module 2 provides a feedback signal to the supplying-end coil 171 of the supplying-end module 1 via the receiving-end coil 281. The low power loss characteristic of the amplitude modulation circuit 24 does not cause any significant voltage sinking at this time. The feedback signal is then decoded by the signal analysis circuit 13 and then transmitted to the supplying-end microprocessor 11 of the supplying-end module 1 for analysis by the built-in anti-noise signal analysis software of the supplying-end microprocessor 11. At this time, the power supplying unit 16 of the supplying-end module 1 keeps supplying high-power energy to the receiving-end coil 281 of the receiving-end module 2 through the supplying-end coil 171. Ringing noises due to switching of the N-type MOSFET component 242 of the amplitude modulation circuit 24 and the N-type MOSFET component 25 of the protection circuit breaker 25 will be eliminated by the built-in anti-noise signal analysis software of the supplying-end microprocessor 11, enabling the signal analysis circuit 13 to analyze the data signal accurately and to disregard the follow-up noises. Thus, the supplying-end microprocessor 11 will not misjudge the data signal as a data code upon a voltage interruption of the built-in comparator, enabling the power supplying unit 16 of the supplying-end module 1 to keep supplying power supply to the receiving-end module 2 via the supplying-end coil 171. Thus, the power-receiving function of the receiving-end module 2 keeps working normally, assuring high stability of system operation.

Further, the definitions of the reference numerals at the left side in FIGS. 6, 7 and 8 are explained as follows:
1: Control signal of N-type MOSFET component 242.
2: Control signal of N-type MOSFET component 253.
3: Output signal of signal analysis circuit 13.
4: Signal of supplying-end microprocessor 11 after interpretation.

Figure 9:
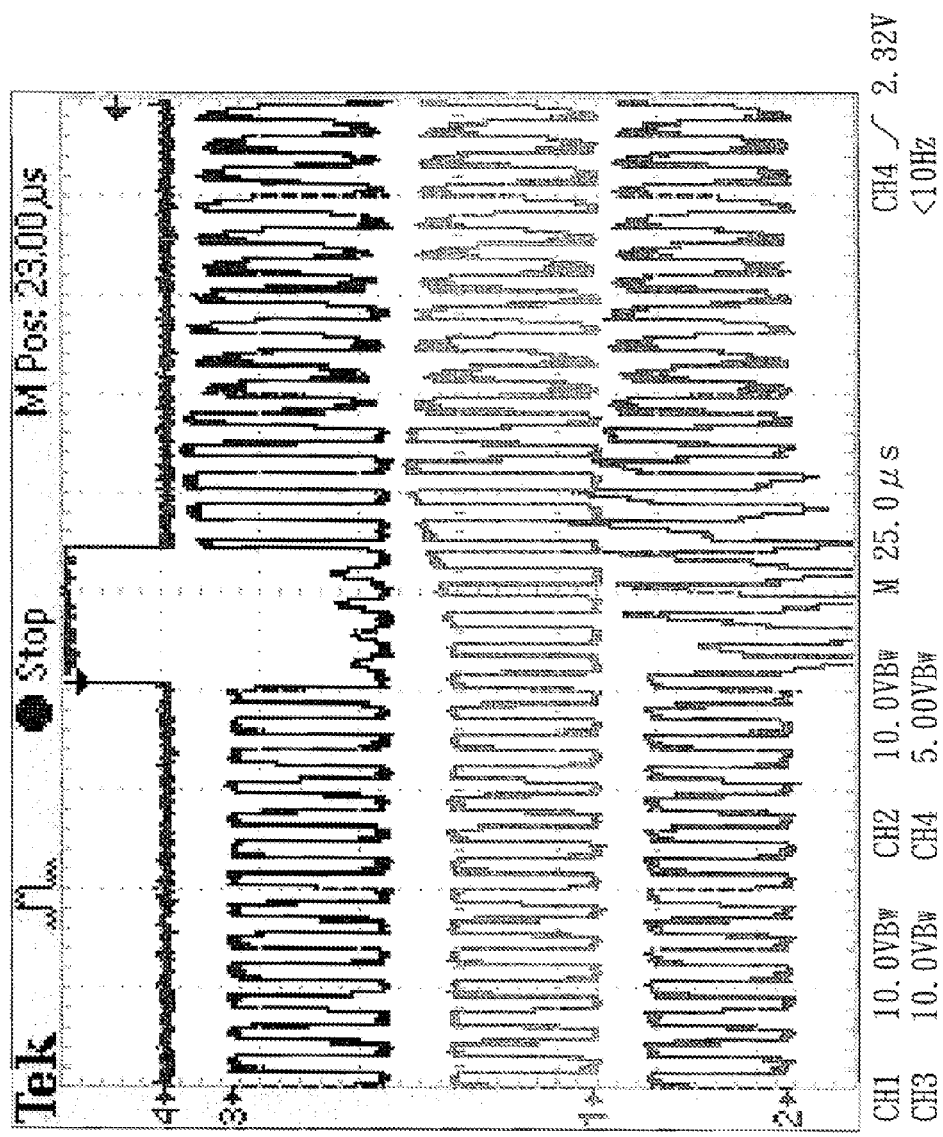
FIG. 9 is a signal waveform chart of the receiving-end coil in accordance with the present invention.
Figure 10:
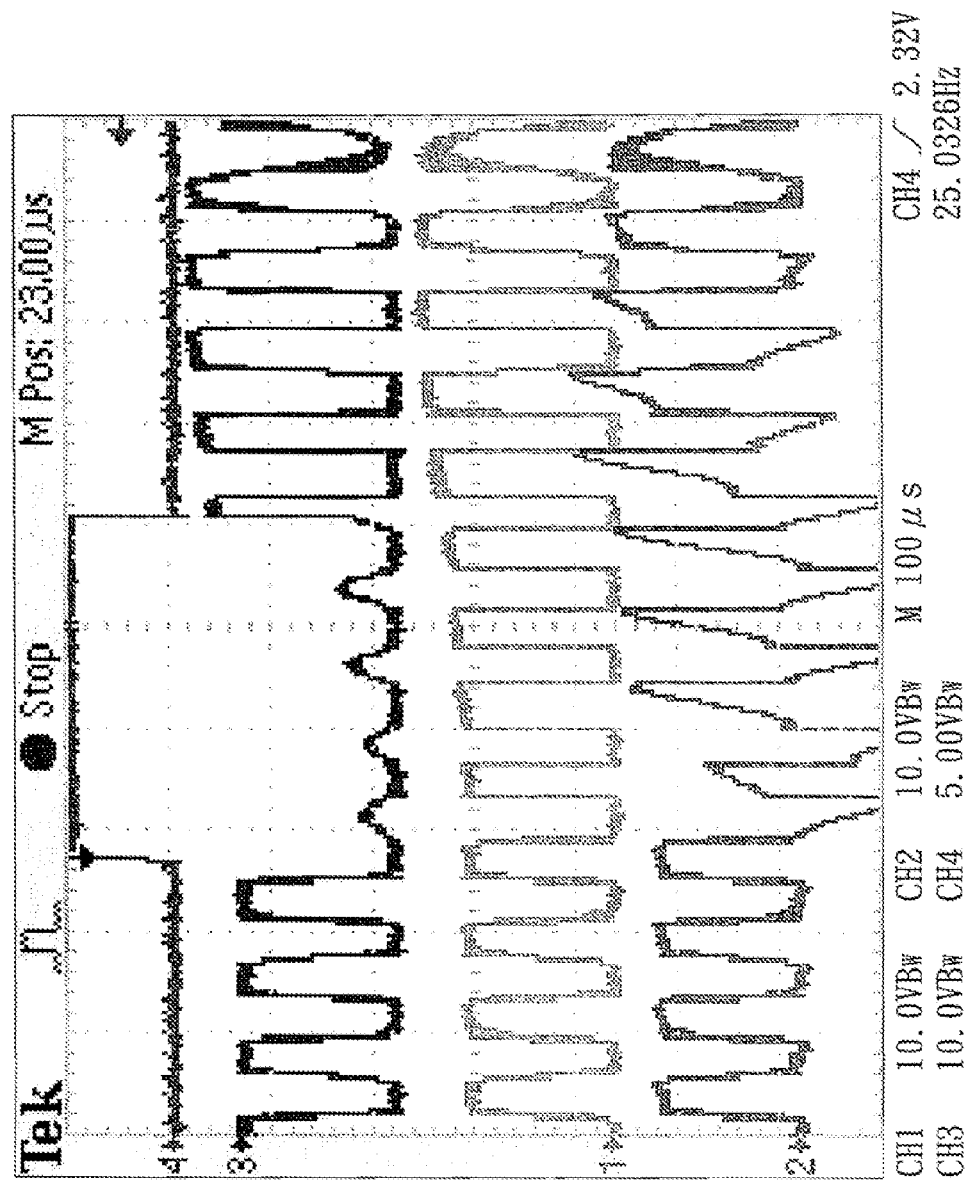
FIG. 10 is a waveform chart of a low power output signal of the receiving-end coil in accordance with the present invention.
Figure 11:
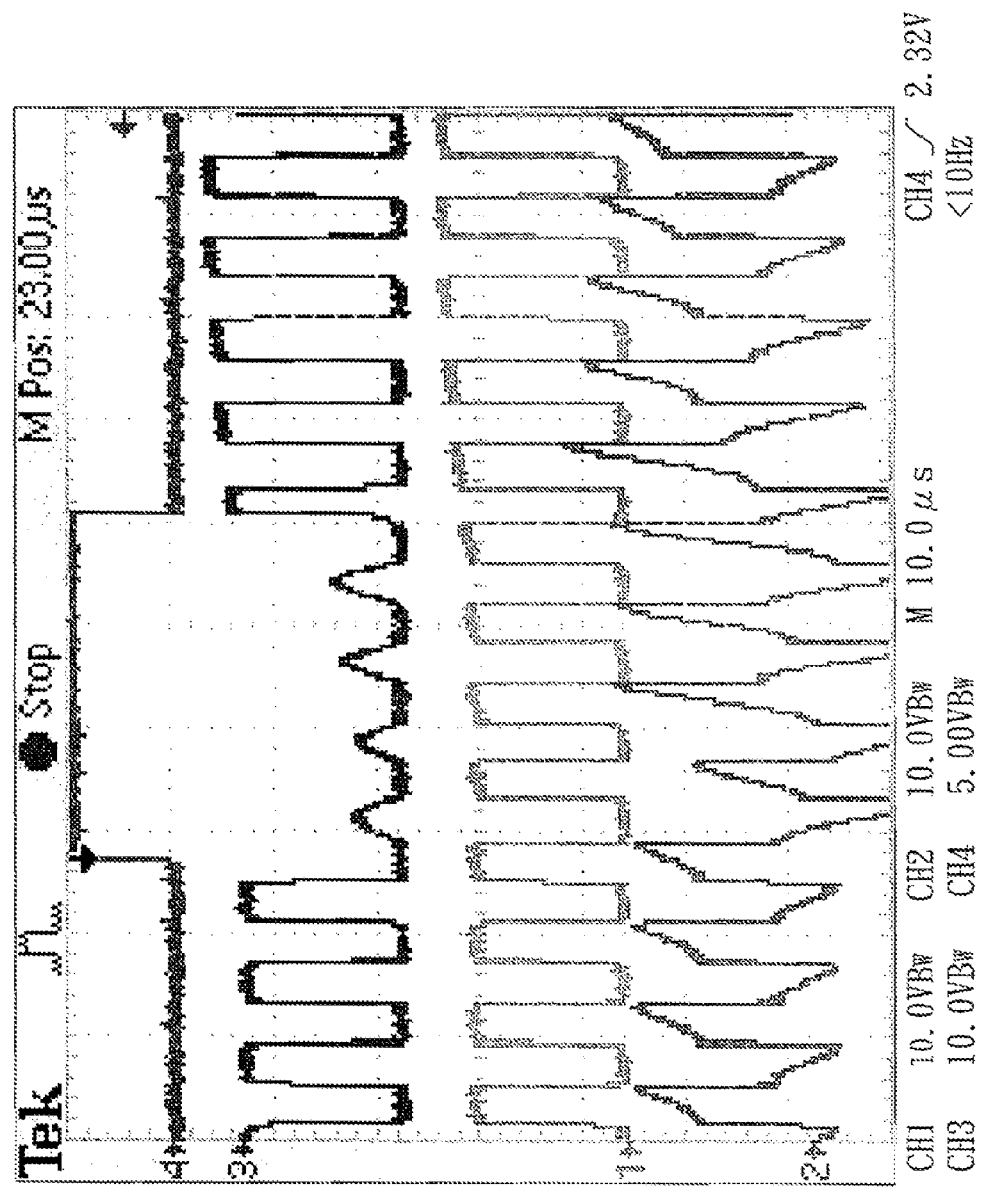
FIG. 11 is a waveform chart of a high power output signal of the receiving-end coil in accordance with the present invention.
Figure 12:
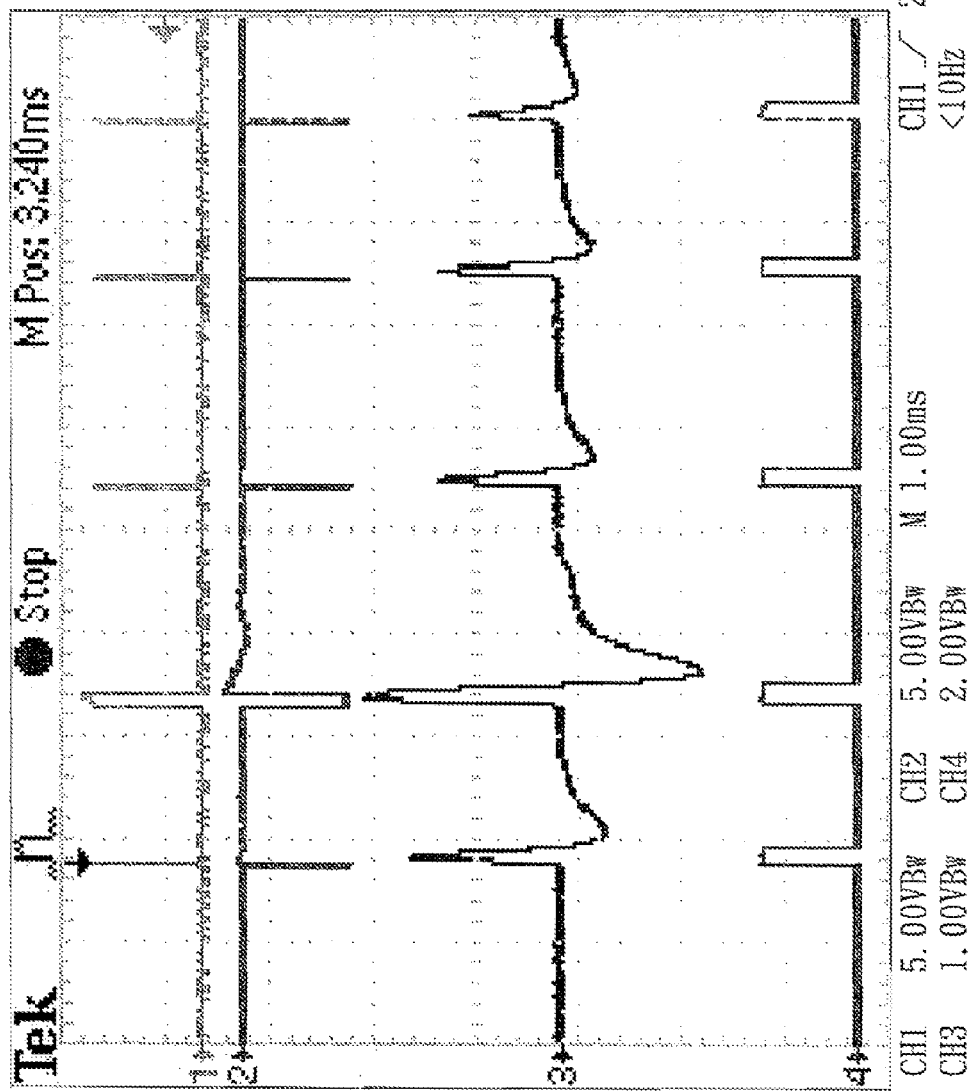
FIG. 12 is a signal waveform chart of the prior art.
Figure 13:
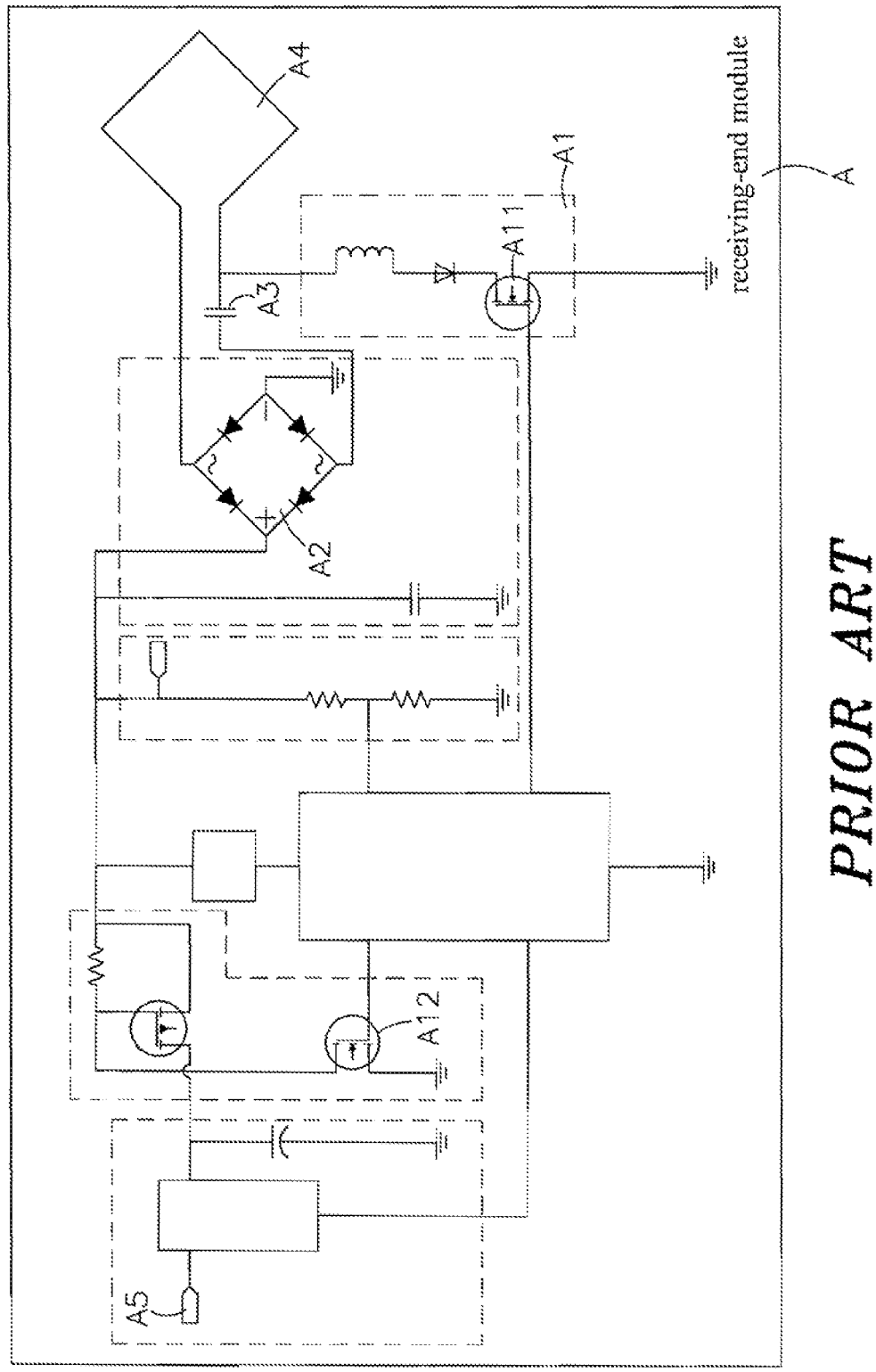
FIG. 13 is a circuit diagram of the receiving-end module according to the prior art.

Further, the definitions of the reference numerals at the left side in FIGS. 9, 10 and 11 are explained as follows:
1: Signal between resonant circuit 28 and rectifier 231.
2: Signal between receiving-end coil 281 and resonant circuit 28.
3: Signal between receiving-end coil 281 and rectifier 231.
4: Control signal of N-type MOSFET component 242.

Referring to FIGS. 9, 10 and 11, the receiving-end coil 281 of the receiving-end module 2 has one end thereof electrically connected to the ground (GND) through the resistor (or inductor) 241 and N-type MOSFET component 242 of the amplitude modulation circuit 24 and also connected to one end of the rectifier 231 of the rectifier and filter circuit 23, and the other end thereof connected to the other end of the rectifier 231 through the resonant circuit 28. Thus, during signal modulation of the amplitude modulation circuit 24, the data signal in the loop between the receiving-end coil 281 and the rectifier 231 is dissipated, the loop between the receiving-end coil 281 and the resonant circuit 28 keeps working normally, enabling the power supply being transmitted by the supplying-end coil 171 to be transferred to the receiving-end microprocessor 21, the voltage detection circuit 22, the protection circuit breaker 25, the voltage stabilizer circuit 26 and the DC-DC buck converter 27. Thus, the supplying of power supply from the supplying-end module 1 to the receiving-end module 2 maintains normal. In case that the receiving-end module 2 is under a low power output status, the signal at the receiving-end coil 281 can be soon resumed to normal after signal modulation by the amplitude modulation circuit 24, reducing energy dissipation of data transmission. In case that the receiving-end module 2 is under a high power output status, the receiving-end coil 281 provides an effect of heavy load when the amplitude modulation circuit 24 is modulating a signal. At this time, the signal analysis scheduling of the built-in anti-noise signal analysis software of the supplying-end microprocessor 11 can eliminate ringing noises. Thus, the receiving-end coil 281 can quickly return to normal after signal modulation, reducing energy dissipation of data transmission.

It is to be understood that the above description simply explains one embodiment of the present invention, which shall not be used as limitations of the invention. According to the low-loss data transmission method for high-power induction-type power supply system of the present invention, the supplying-end microprocessor 11 of the supplying-end module 1 provides power supply to the receiving-end coil 281 of the receiving-end module 2; the data signal provided by the receiving-end module 2 is fed back to the supplying-end coil 171 of the supplying-end module 1 through the receiving-end coil 281. During the power supplying operation, the signal analysis scheduling of the built-in anti-noise signal analysis software of the supplying-end microprocessor 11 can eliminate noises produced due to unstable output load at the power output terminal 263, assuring high stability of the transmission of data signal and reducing g energy dissipation of data transmission. Further, subject to the design in which the receiving-end coil 281 of the receiving-end module 2 has one end thereof electrically connected to the ground (GND) through the resistor (or inductor) 241 and N-type MOSFET component 242 of the amplitude modulation circuit 24 and also connected to one end of the rectifier 231 of the rectifier and filter circuit 23, and the other end thereof connected to the other end of the rectifier 231 through the resonant circuit 28, signal modulation is performed on a low voltage DC square wave, and therefore, the N-type MOSFET component 242 of the amplitude modulation circuit 24 will not burn out easily, assuring a high level of stability of the supplying of power supply to the receiving-end module 2.

In conclusion, the low-loss data transmission method for high-power induction-type power supply system of the present invention has the features and advantages as follows:

1. The supplying-end microprocessor 11 of the supplying-end module 1 has built-in anti-noise signal analysis software that can remove noises from the data signal fed back by the receiving-end module 2 to the supplying-end module 1, assuring high stability of the transmission of data signal and reducing energy dissipation of data transmission.
2. Subject to the design in which the receiving-end coil 281 of the receiving-end module 2 has one end thereof electrically connected to the ground (GND) through the resistor (or inductor) 241 and N-type MOSFET component 242 of the amplitude modulation circuit 24 and also connected to one end of the rectifier 231 of the rectifier and filter circuit 23, and the other end thereof connected to the other end of the rectifier 231 through the resonant circuit 28, signal modulation is performed on a low voltage DC square wave, and therefore, the N-type MOSFET component 242 of the amplitude modulation circuit 24 will not burn out easily when the supplying-end coil 171 of the supplying-end module 1 is supplying power supply to the receiving-end coil 281, assuring a high level of stability of the supplying of power supply to the receiving-end module 2.
3. The feedback signal provided by the receiving-end module 2 to the supplying-end microprocessor 11 is decoded by the signal analysis circuit 13 and then transmitted to the supplying-end microprocessor 11 for analysis by the built-in anti-noise signal analysis software of the supplying-end microprocessor 11, assuring high stability of the transmission of power supply and data signal and reducing energy dissipation of signal transmission.

A prototype of low-loss data transmission method for high-power induction-type power supply system has been constructed with the features of FIGS. 1-11. The low-loss data transmission method for high-power induction-type power supply system works smoothly to provide all of the features disclosed earlier.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A low-loss data transmission method for high-power induction-type power supply system consisting of a supplying-end module and a receiving-end module, comprising the steps of:
    (a) initializing a data analysis software;
    (b) starting up a main program of the supplying-end module and clearing counters therein;
    (c) waiting for the generation of an interruption signal by a built-in voltage comparator of a supplying-end microprocessor of the supplying-end module;
    (d) determining whether or not the time interval between the generation of the present interruption signal and the generation of the last interruption signal is higher than a predetermined time interval reading threshold, and then proceeding to step (e) when the time interval is lower than the predetermined time interval reading threshold, or step (f) when the time interval is higher than the predetermined time interval reading threshold;
    (e) judging the signal to be a noise signal and omitting the signal, and then returning to step (b);
    (f) examining the time interval between the present trigger signal and the last modulated signal and then proceeding to step (g) if this time interval is below a predetermined non-modulated signal length reading threshold, or step (h) if this time interval surpasses the non-modulated signal reading threshold;
    (g) judging the signal to be a ringing noise and omitting the signal, and then returning to step (b);

(h) running a data code inspection program;
(i) examining the presence of a start signal, and then proceeding to step (n) when a start signal is in presence, or step (j) when no start signal is in presence;
(j) examining whether or not the length of the signal is equal to a predetermined start signal length, and then proceeding to step (k) when positive, or step (m) when negative;
(k) the length of the signal being equal to the predetermined start signal length, and then marking the signal with a start byte and then returning to step (c);
(l) the received data signal being unrecognizable and the data receiving being failed, and then returning to step (b) to reset the counters and to wait for a next comparator interruption for data analysis;
(m) waiting for receiving a next data signal as a start signal is in presence and then stopping the time length in which the counter retrieves the interruption signal;
(n) judging the currently received time length to be a modulated data signal by means of transition triggering, and then proceeding to step (o) if the signal is a modulated signal, or step (u) if the signal is not a modulated signal;
(o) checking the logic to be in conformity with the modulated length range of [logic 1] or [logic 0], and then proceeding to step (p) when in conformity, or returning to step (l) when not in conformity;
(p) the detected time length being within the set range, filling the corresponding logic bits in a receiving memory, and then proceeding to step (q);
(q) checking whether or not the assigned number of bits has been completely received, and then returning to step (c) to wait for a next comparator interruption when negative, or proceeding to step (r) when positive;
(r) checking the correctness of the data code of the code, and then proceeding to step (s) if the data code is correct, or returning to step (l) if the data code is incorrect;
(s) completing data receiving and clearing the counter so that the time length in which a next interruption occurs after completion of the present data transmission can be recognized;
(t) outputting the received data code for use by the system, and then returning to step (b);
(u) checking the logic to be in conformity with the non-modulated length range of [logic 1] or [logic 0], and then returning to step (p) when in conformity, or to step (l) when not in conformity.

2. The low-loss data transmission method for high-power induction-type power supply system as claimed in claim 1, wherein the initialization of said data analysis software in step (a) is to define data length, start signal length, modulated and non-modulated logic signal lengths, non-modulated signal length reading threshold, and data transmission time interval reading threshold.

3. The low-loss data transmission method for high-power induction-type power supply system as claimed in claim 1, wherein said supplying-end module comprises a supplying-end microprocessor, a power driver unit, a signal analysis circuit, a coil voltage detection circuit, a display unit, a power supplying unit, a resonant circuit and a supplying-end coil, said power driver unit, said signal analysis circuit, said coil voltage detection circuit, said display unit and said power supplying unit being respectively electrically coupled to said supplying-end microprocessor, said power driver unit comprising a MOSFET driver, a high-end MOSFET component and a low-end MOSFET component, said MOSFET driver being electrically coupled with said supplying-end microprocessor, said high-end MOSFET component and said low-end MOSFET component being respectively electrically coupled with said resonant circuit, said high-end MOSFET component being also electrically coupled with said power supplying unit and said resonant circuit, said signal analysis circuit comprising a rectifier diode electrically coupled with said resonant circuit, a series of resistors electrically connected in series to said rectifier diode and a plurality of capacitors electrically connected in parallel to said series of resistors, said coil voltage detection circuit consisting of resistors and capacitors, said power supplying unit being also electrically coupled with said power driver unit, said power supplying unit comprising a power source, two current sensing shunt resistors electrically connected in series to said power source and a DC-DC buck converter electrically connected to said power source, said supplying-end coil being electrically coupled with said resonant circuit for transmitting power supply and data signal wirelessly.

4. The low-loss data transmission method for high-power induction-type power supply system as claimed in claim 1, wherein said supplying-end microprocessor has built therein operating, control and anti-noise signal analysis software and a voltage comparator.

5. The low-loss data transmission method for high-power induction-type power supply system as claimed in claim 1, wherein said receiving-end module comprises a receiving-end microprocessor, a voltage detection circuit electrically coupled to said receiving-end microprocessor, a rectifier and filter circuit electrically coupled to said receiving-end microprocessor, an amplitude modulation circuit electrically coupled to said receiving-end microprocessor, a protection circuit breaker electrically coupled to said receiving-end microprocessor, a voltage stabilizer circuit electrically coupled to said receiving-end microprocessor, a DC-DC buck converter electrically coupled to said receiving-end microprocessor, and a resonant circuit and a receiving-end coil electrically connected in parallel to a rectifier of said rectifier and filter circuit, said receiving-end coil being electrically connected with said amplitude modulation circuit in series.

6. The low-loss data transmission method for high-power induction-type power supply system as claimed in claim 5, wherein said amplitude modulation circuit comprises a resistor and an N-type MOSFET component electrically connected in series.

7. The low-loss data transmission method for high-power induction-type power supply system as claimed in claim 5, wherein said amplitude modulation circuit comprises a capacitor and an N-type MOSFET component electrically connected in series.

* * * * *